US009511698B2

(12) United States Patent
Arefi et al.

(10) Patent No.: US 9,511,698 B2
(45) Date of Patent: *Dec. 6, 2016

(54) VEHICLE SEAT BACK HAVING SUPPORT MEMBERS WITH INTEGRATED RECLINER HEART

(75) Inventors: Majid Arefi, West Bloomfield, MI (US); Shawn Anthony Dixon, Windsor (CA); Michael Medoro, Northville, MI (US); Johnathan Andrew Line, Northville, MI (US); Khaled Ayyash, Ann Arbor, MI (US); James Creighton, Northville Township, MI (US); Vanja Cemalovic, Northville, MI (US); Daniel Ferretti, Commerce Township, MI (US); Robert Moore, Plymouth, MI (US)

(73) Assignee: Ford Global Technologist, LLC, Dearborn, MI (US)

( * ) Notice: Subject to any disclaimer, the term of this patent is extended or adjusted under 35 U.S.C. 154(b) by 1025 days.

This patent is subject to a terminal disclaimer.

(21) Appl. No.: 13/152,667

(22) Filed: Jun. 3, 2011

(65) Prior Publication Data

US 2012/0306251 A1   Dec. 6, 2012

(51) Int. Cl.
B60N 2/68 (2006.01)

(52) U.S. Cl.
CPC ........................................ B60N 2/68 (2013.01)

(58) Field of Classification Search
CPC ........................................................ B60N 2/68
USPC ........................... 297/452.18, 452.19, 216.13
See application file for complete search history.

(56) References Cited

U.S. PATENT DOCUMENTS

| 6,857,698 | B2 | 2/2005 | Saberan et al. |
| 7,066,552 | B2 * | 6/2006 | Yoshida .................. 297/452.18 |
| 7,083,230 | B2 | 8/2006 | Kull et al. |
| 7,540,563 | B2 * | 6/2009 | Ogawa et al. ........... 297/216.13 |
| 7,731,292 | B2 * | 6/2010 | Ishijima et al. ......... 297/452.18 |
| 2004/0113481 | A1 * | 6/2004 | Saberan et al. ......... 297/452.18 |
| 2008/0019767 | A1 | 1/2008 | Bittner et al. |
| 2010/0096895 | A1 | 4/2010 | Nonomiya |
| 2010/0187886 | A1 | 7/2010 | Yamada et al. |
| 2010/0187893 | A1 | 7/2010 | Yamada et al. |

* cited by examiner

*Primary Examiner* — David R Dunn
(74) *Attorney, Agent, or Firm* — Vichit Chea; Price Heneveld LLP (57) ABSTRACT

A vehicle seat back has first and second support members each having a central web and a rear wall extending therefrom. A seat base is operably connected with the first and second support members. A recliner heart operably connects the seat base with the first and second support members. A shear center of the first and second support members extends along an inside corner connection of the central web and the rear wall of the first and second support members and into the seat base.

20 Claims, 11 Drawing Sheets

FIG. 13 ns VEHICLE SEAT BACK HAVING SUPPORT MEMBERS WITH INTEGRATED RECLINER HEART

FIELD OF THE INVENTION

The present invention generally relates to a vehicle seat back that includes support members having an integrated recliner heart. The vehicle seat back efficiently relays load forces to the frame of a vehicle, thereby minimizing weight and size of the vehicle seat back.

BACKGROUND OF THE INVENTION

Vehicle seats generally include back supports to provide comfort to a user and to protect a user during a collision event.

SUMMARY OF THE INVENTION

One aspect of the present invention includes a vehicle seat back having first and second support members each having a central web and a rear wall extending therefrom. A seat base is operably connected with the first and second support members. A recliner heart operably connects the seat base with the first and second support members. A shear center of the first and second support members extends along an inside corner connection of the central web and the rear wall of the first and second support members and into the seat base.

Another aspect of the present invention includes a vehicle seat back having first and second support members with a central web. A scalloped upper cross member extends between the first and second support members. A rear wall extends along the central web. Lateral load forces are applied to the vehicle seat back that result in a shear center that extends along an inside corner defined by the connection of the rear wall and the central web and into a seat base.

Another aspect of the present invention includes a vehicle seat back having an upper cross member having a scalloped forward portion. A lower cross member includes a scalloped rearward portion. First and second support members are connected by the upper and lower cross members and include a central web connected with a recliner heart. Lateral forces are applied to the vehicle seat back that result in a shear center that extends along an inside corner connection of the central web and a rear wall of the first and second support members and into the seat base.

These and other aspects, objects, and features of the present invention will be understood and appreciated by those skilled in the art upon studying the following specification, claims, and appended drawings.

DETAILED DESCRIPTION OF EMBODIMENTS

Figures 1, 2:
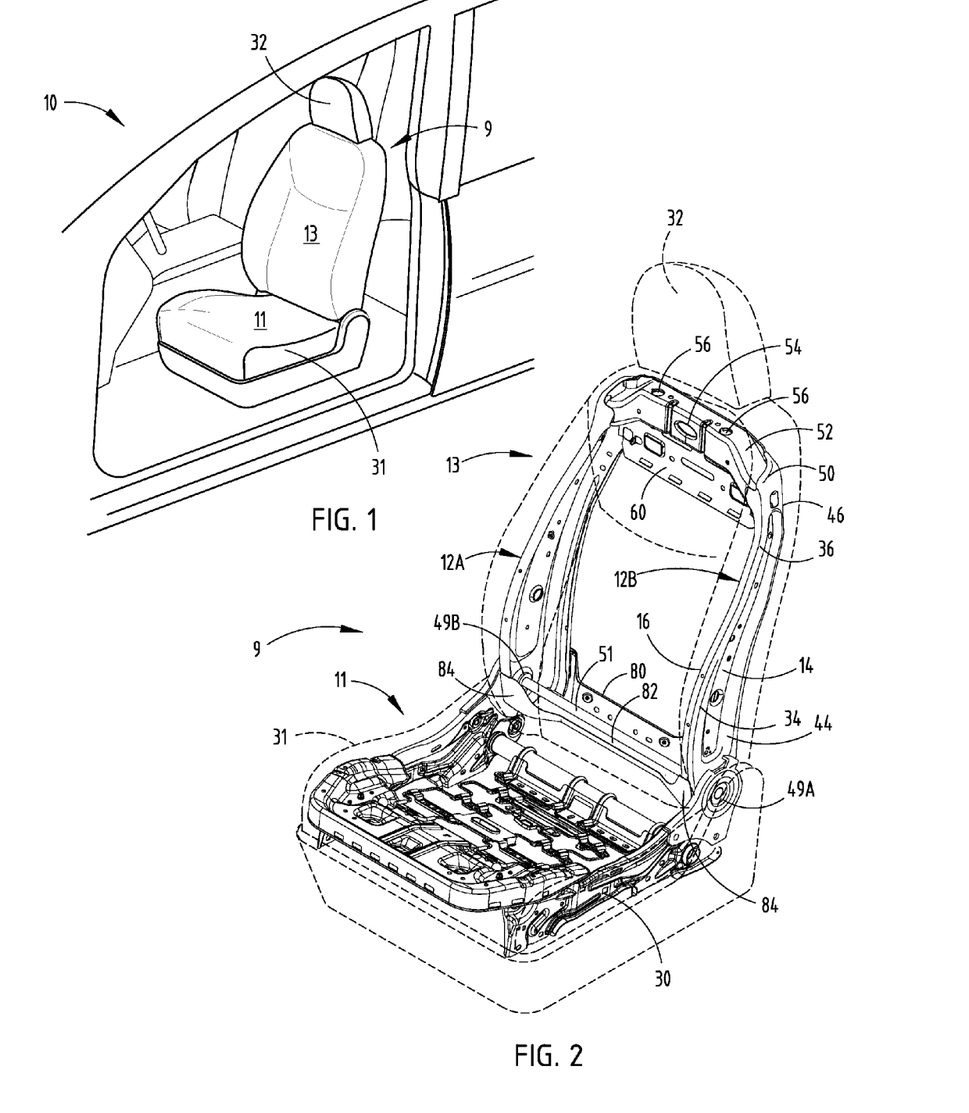
FIG. 1 is a top perspective view of a vehicle seat disposed inside a vehicle.
FIG. 2 is a top perspective view of the vehicle seat of FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-15, the reference numeral 10 generally designates a vehicle with a seat 11 and a seat back 13 that define a seating assembly 9. The seat back 13 includes a vehicle seat back member 12A with a central web 14. A front wall 16 extends from the central web 14. A rear wall 18 extends along a substantial portion of a rear edge 20 of the central web 14. A shear center load path 22 of the vehicle seat back member 12A is disposed proximate an inside corner 24 of the vehicle seat back member 12A defined by the connection of the central web 14 and the rear wall 18, and extends substantially along the longitudinal extent of the rear wall 18.

As shown in FIG. 2, the seat back 13 includes the first support member or vehicle seat back member 12A and a second support member or vehicle seat back member 12B. The second vehicle seat back member 12B has a mirror image construction relative to the first vehicle seat back member 12A. Throughout this description, features of the first vehicle seat back member 12A will be discussed. However, it will be understood by one having ordinary skill in the art that these same features are also present in the second vehicle seat back member 12B, unless otherwise stated.

Referring again to FIGS. 1 and 2, the vehicle seat back member 12A is generally designed for use inside the vehicle 10 in either a front driver seat, a front passenger seat, or a rear seat of the vehicle 10. The seat 11 generally includes the vehicle seat back member 12A, as well as a seat base 30 with a cushion 31 and a headrest 32. It is contemplated that the entire seat 11 may be adjustable, either manually or automatically, as understood by one having ordinary skill in the art. The seat 11 is generally designed for the comfort of a passenger, as well as to accommodate and protect a passenger during a collision event. To assist in accommodating the back of a user, a lower portion 34 of the front wall 16 of the vehicle seat back member 12A includes a substantially convex construction that conforms to the back of a user. An upper portion 36 of the front wall 16 curves slightly forward to provide a concave construction. Additionally, when viewed from the back, a lower portion 38 of the rear wall 18 of the vehicle seat back member 12A includes a substantially concave construction. An upper portion 39 (FIG. 3) of the rear wall 18 has a generally linear construction. The general contour of the vehicle seat back member 12A provides comfort and support to the back of a user while minimizing the total space needed by the seat 11. Further, not only are the first and second vehicle seat back members 12A, 12B generally designed to conform to the shape of an occupant's back and provide substantial support to the occupant's back during normal use, the first and second vehicle seat back members 12A, 12B help protect an occupant during collision events.

Figure 3:
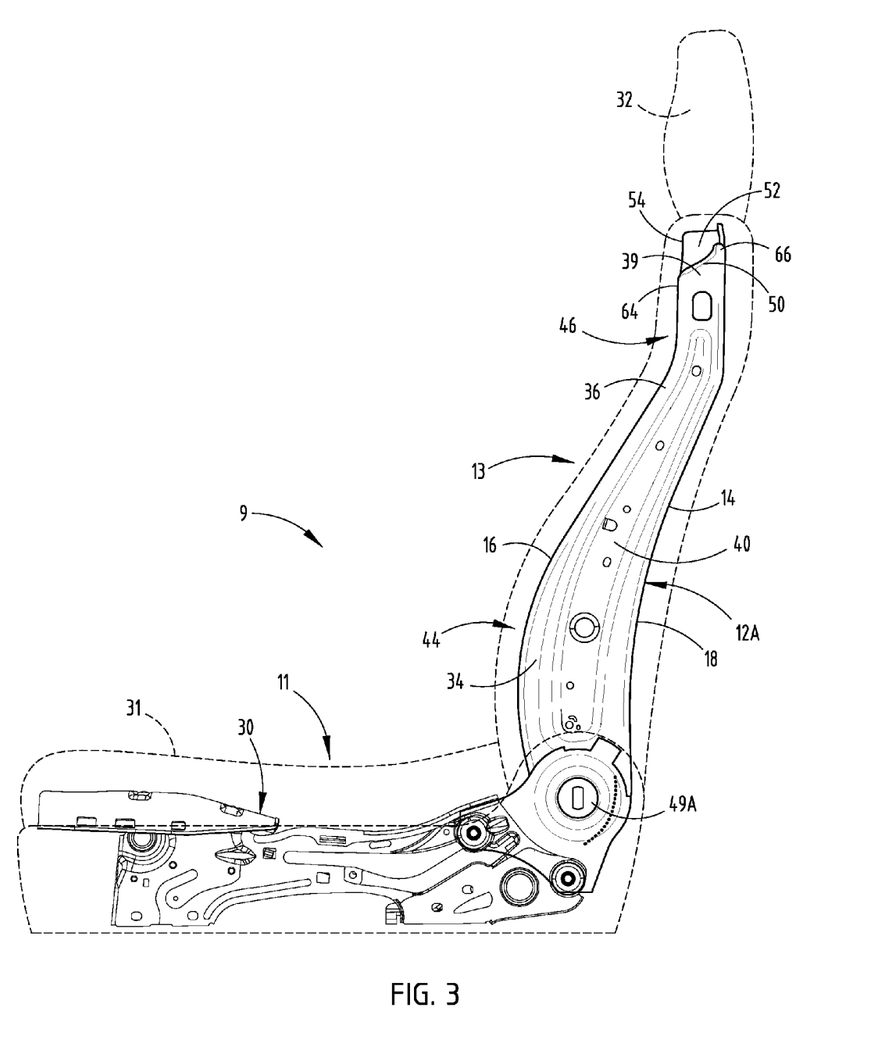
FIG. 3 is a side elevational view of the vehicle seat of FIG. 2.
Figure 4:
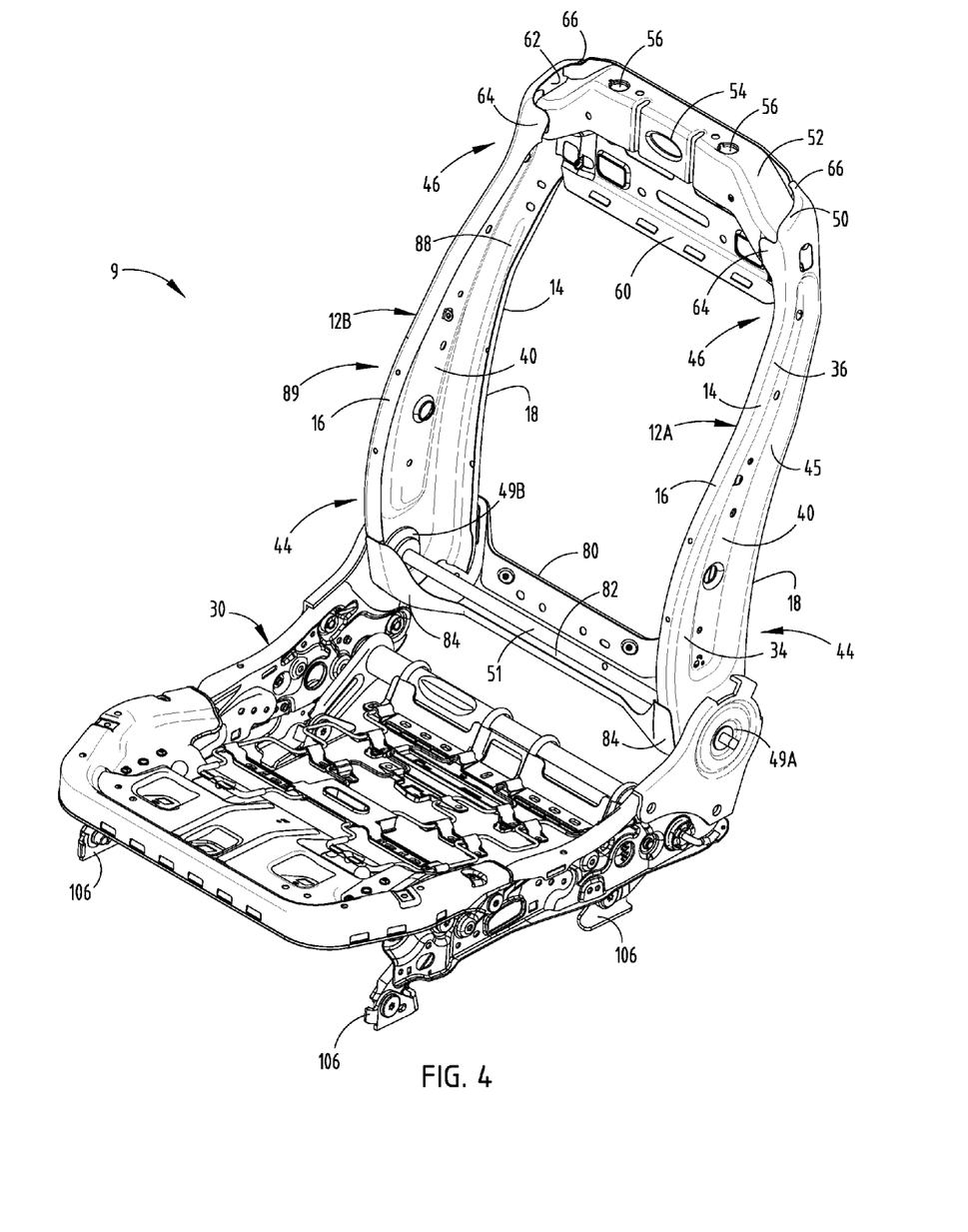
FIG. 4 is a top perspective view of the vehicle seat with a cover and padding removed.

As illustrated in FIGS. 3 and 4, the central web 14 of the vehicle seat back member 12A includes a generally recessed portion 40 between a front edge 41 and the rear edge 20 of the central web 14. The recessed portion 40 provides additional structural integrity to the entirety of the vehicle seat back member 12A. The recessed portion 40 is defined by a continuous sloped ledge 45 that does not extend beyond an outer periphery of the central web 14. The recessed portion 40 includes a variety of apertures and connecting points for securing various mechanical devices to the vehicle seat back member 12A that aid in functionality including airbag deployment, lumbar support, seat back tilt, etc. A bottom portion 44 of the vehicle seat back member 12A is generally deeper in construction than a top portion 46 of the vehicle seat back member 12A. Stated differently, when viewed from the side, the top portion 46 of the first and second vehicle seat back members 12A, 12B is narrower than the bottom portion 44 of the first and second vehicle seat back members 12A, 12B. When viewed from the side, the recessed portion 40 is generally wider at the bottom portion 44 of the first and second vehicle seat back members 12A, 12B and narrower at the top portion 46 of the first and second vehicle seat back members 12A, 12B.

Each of the first and second vehicle seat back members 12A, 12B includes a recliner heart aperture 48 (FIG. 5) adapted to receive recliner hearts 49A, 49B that operably connect the seat base 30 with the first and second vehicle seat back members 12A, 12B. The top portion 46 of the first and second vehicle seat back members 12A, 12B includes an angled peak 50 adapted to connect with an upper cross support 52. The recliner heart aperture 48 is only minimally larger than the recliner hearts 49A, 49B and is attached thereto by a laser-welding operation. In the illustrated embodiment, the recliner heart apertures 48 are approximately 60 mm across. Each recliner heart 49A and 49B is designed to receive loads directed downward along the shear center load path 22 and relay those loads directly to the seat base 30.

Referring again to FIG. 4, the upper cross support 52 includes a generally scalloped middle portion 54 adapted to accommodate an upper back area of a user. The upper cross support 52 includes apertures 56 adapted to receive guide sleeves that in turn receive headrest posts that extend downwardly from the headrest 32. In addition, the upper cross support 52 includes a lower flange area 60 adapted to interface with the first and second vehicle seat back members 12A, 12B. The top portion 46 of the first and second vehicle seat back members 12A, 12B also include a cupped area 62 adapted to interface with and be secured to the upper cross support 52. Each of the first and second vehicle seat back members 12A, 12B, the upper cross support 52, and a lower cross member 80 can be secured in a variety of ways, such as by mechanical fasteners, welding, etc. The front wall 16 of the first and second vehicle seat back members 12A, 12B includes a front lip 96 that protrudes from the front wall 16 and provides additional structural integrity to the front wall 16. The cupped area 62 is generally defined by a forward attachment flange 64 and a rearward attachment flange 66.

Figure 5:
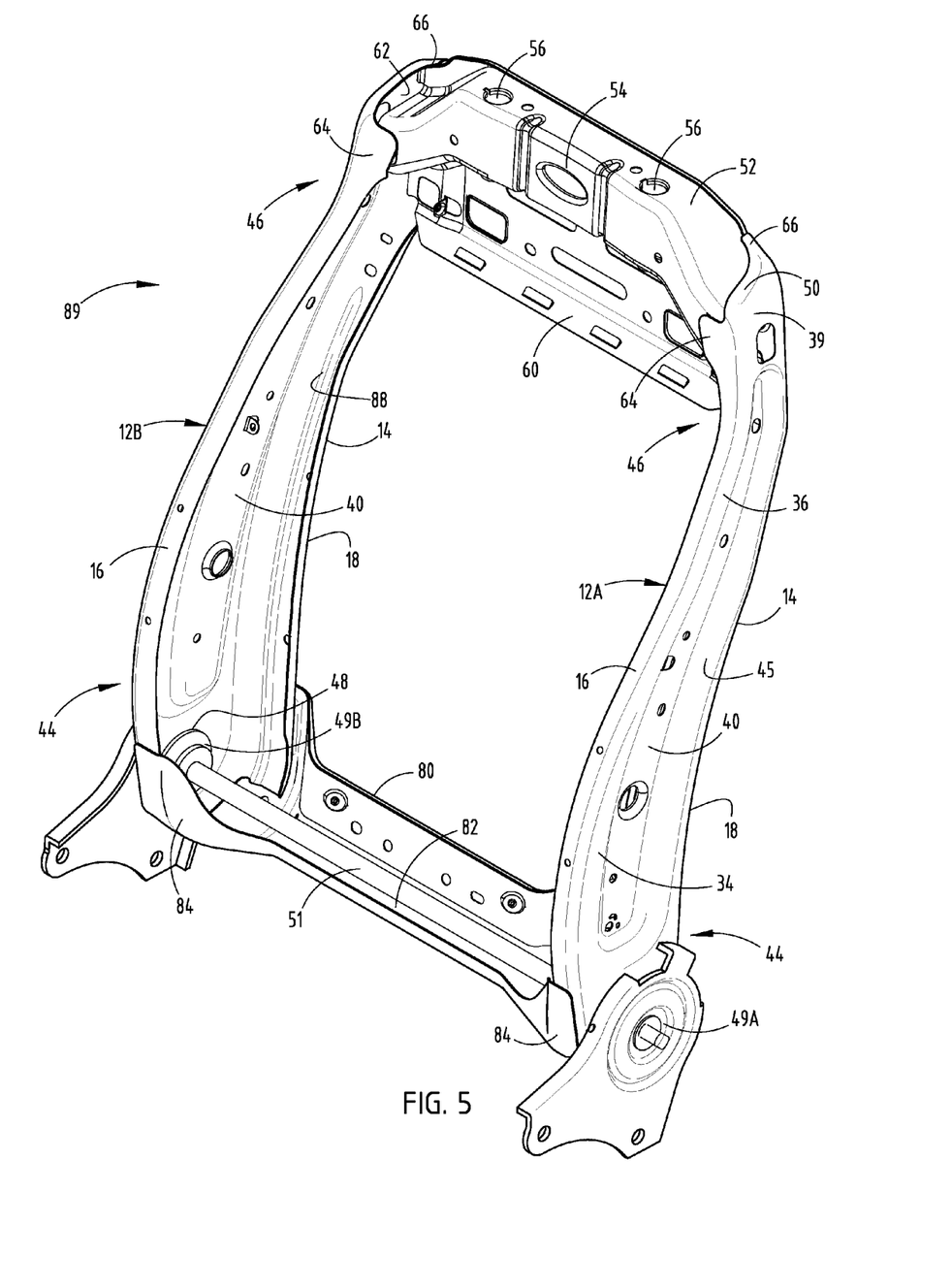
FIG. 5 is a top perspective view of a vehicle seat back.
Figure 6:
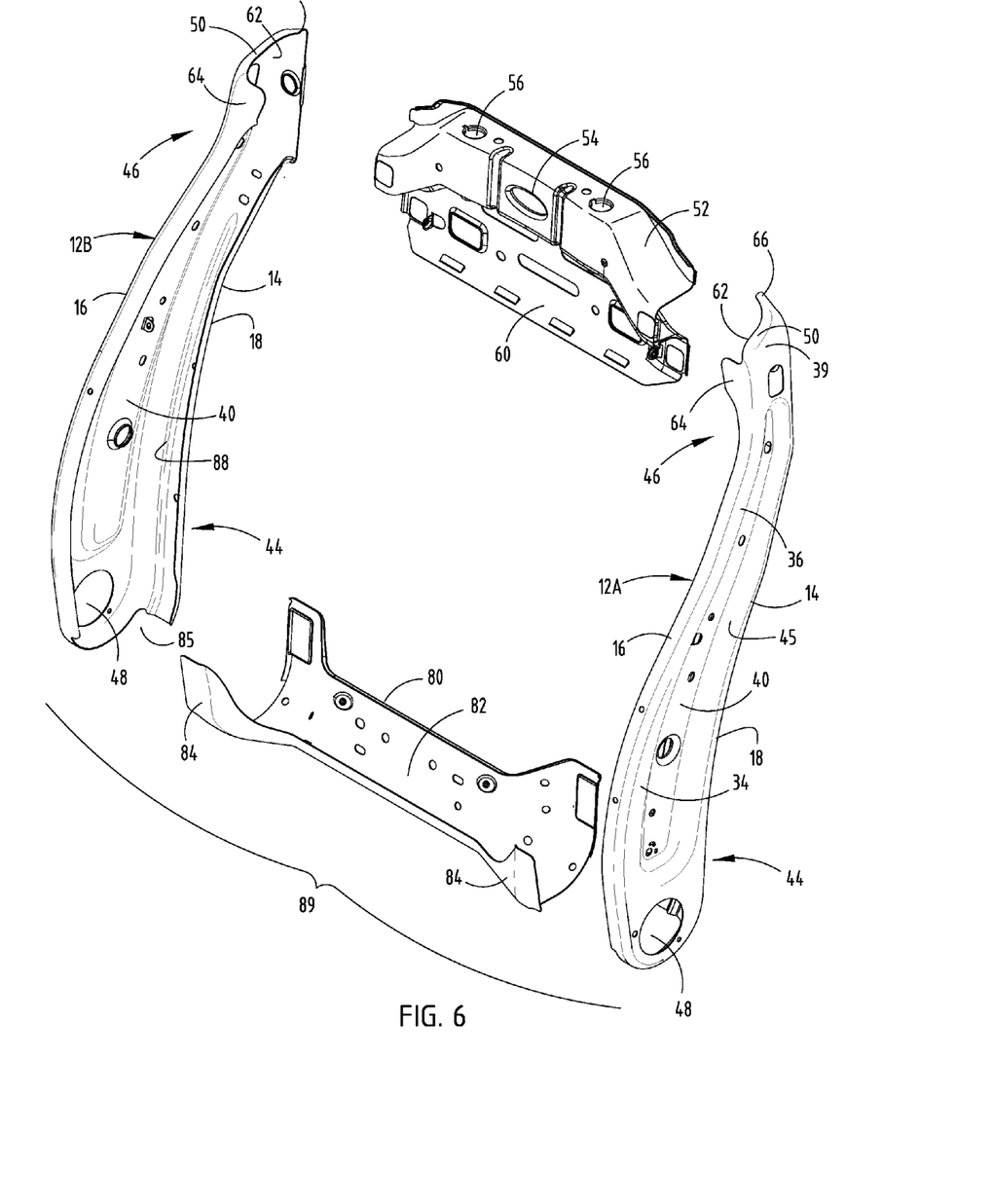
FIG. 6 is an exploded top perspective view of the vehicle seat back of FIG. 5.
Figures 7, 8:
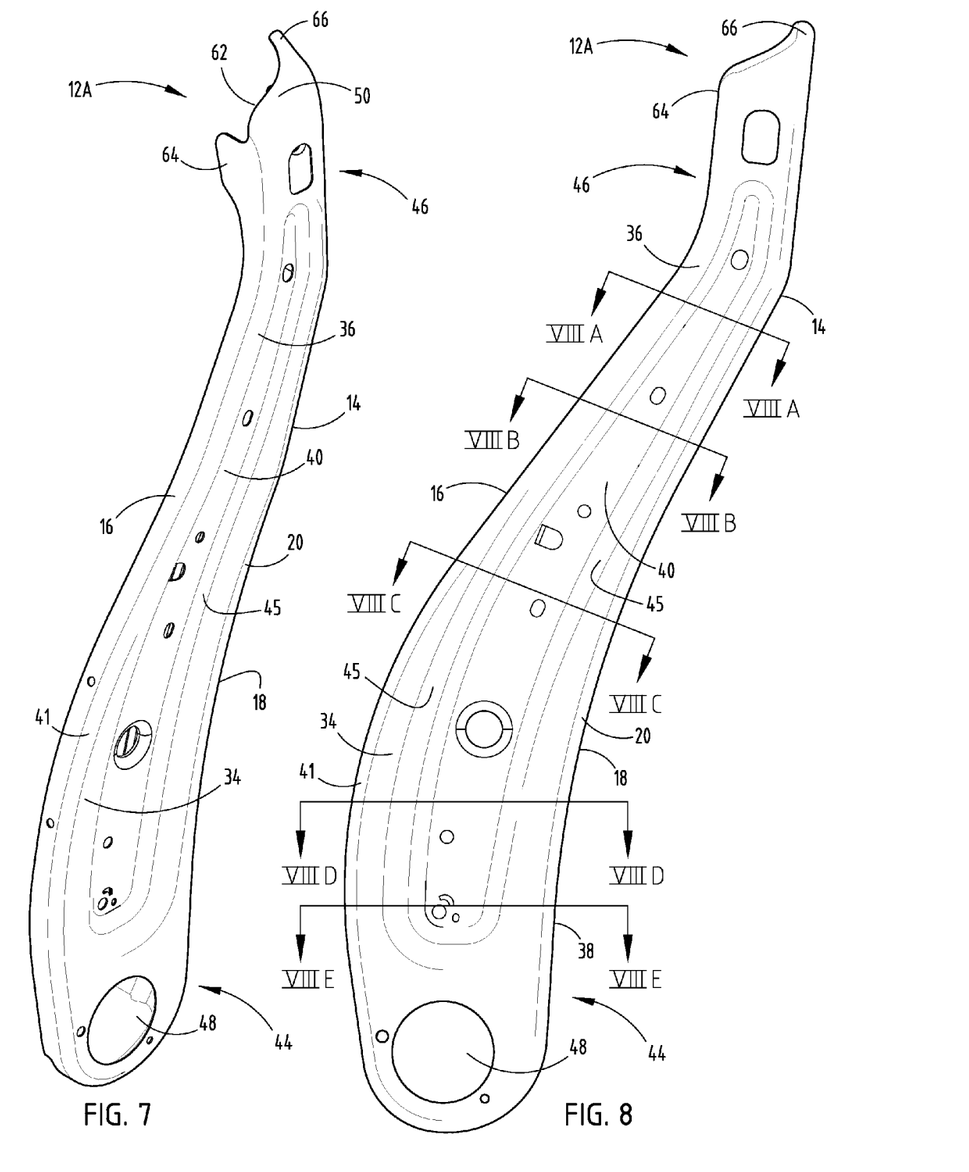
FIG. 7 is an outside top perspective view of a vehicle seat back member.
FIG. 8 is a side elevational view of the vehicle seat back member of FIG. 7.
Figure 8A:
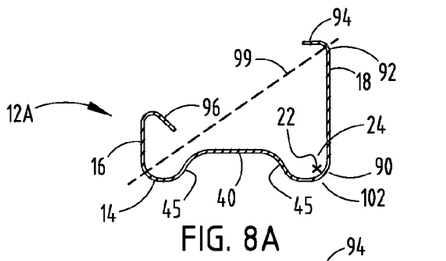
FIG. 8A is a top cross-sectional view taken at line A in FIG. 8.
Figure 8B:
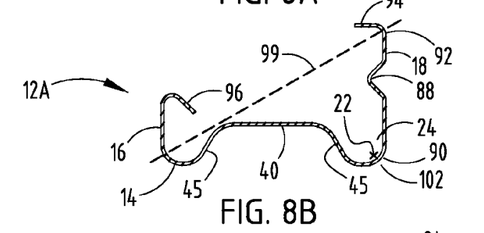
FIG. 8B is a top cross-sectional view taken at line B in FIG. 8.
Figure 8C:
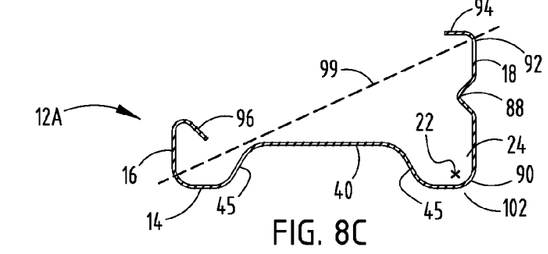
FIG. 8C is a top cross-sectional view taken at line C in FIG. 8.
Figure 8D:
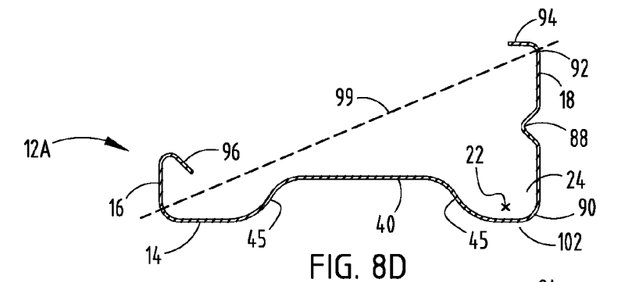
FIG. 8D is a top cross-sectional view taken at line D in FIG. 8.
Figure 8E:
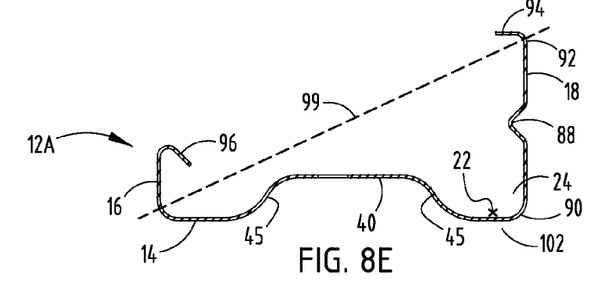
FIG. 8E is a top cross-sectional view taken at line E in FIG. 8.
Figures 9, 10:
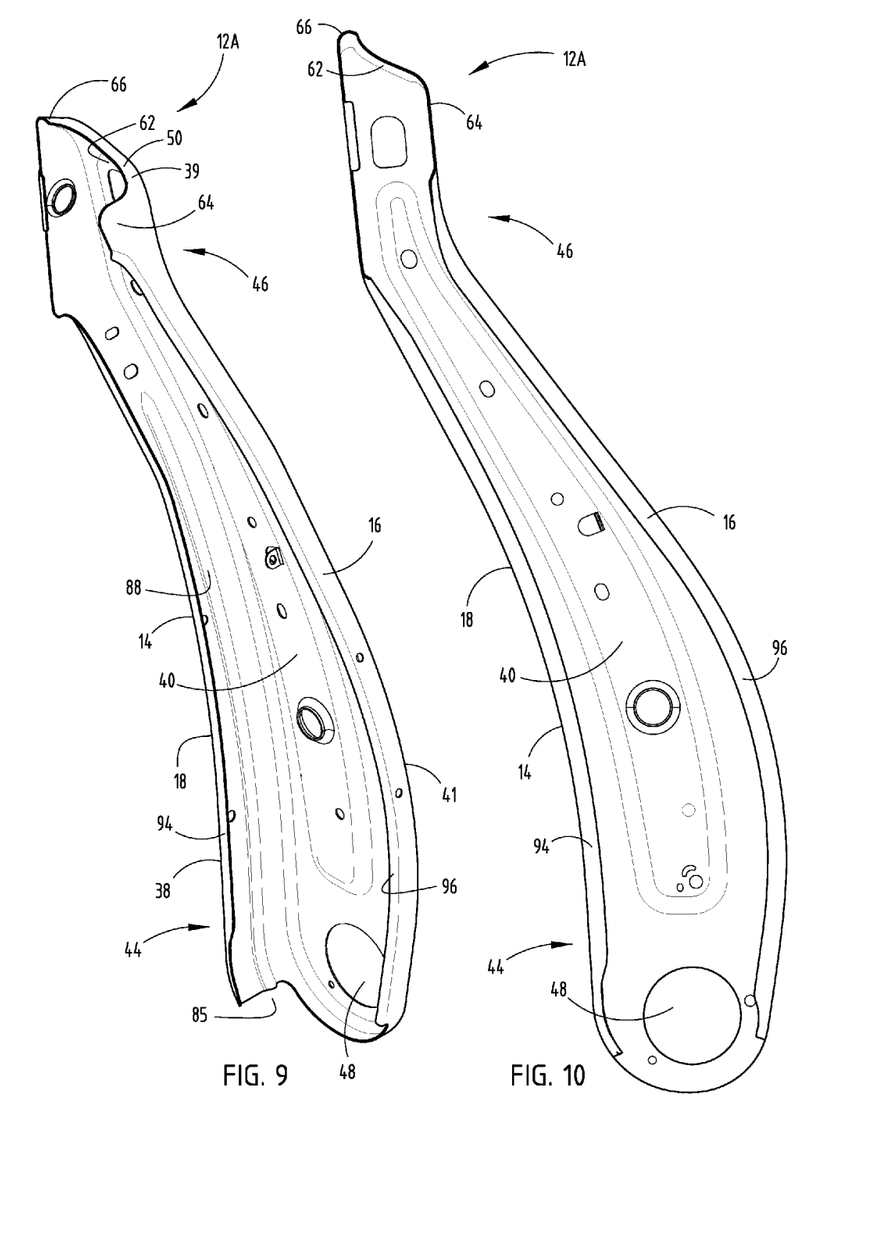
FIG. 9 is an inside top perspective view of the vehicle seat back member of FIG. 7.
FIG. 10 is an inside elevational view of the vehicle seat back member of FIG. 7.

Referring now to FIGS. 5 and 6, the lower cross member 80 extends between the first and second vehicle seat back members 12A, 12B and wraps around the bottom portion 44 of each of the first and second vehicle seat back members 12A, 12B. The lower cross member 80 generally defines a channel 82 adapted to accommodate various mechanical devices extending therethrough including the recliner hearts 49A, 49B and a tie rod 51 that extends between the recliner hearts 49A, 49B. The recliner hearts 49A, 49B connect directly with the first and second vehicle seat back members 12A, 12B, respectively, via laser welding. The recliner hearts 49A, 49B provide a direct interface from the first and second vehicle seat back members 12A, 12B to the seat base 30.

Referring again to FIGS. 5 and 6, the lower cross member 80 includes widened ends 84 adapted to receive and hold the first and second vehicle seat back members 12A, 12B. The bottom portion 44 of each of the first and second vehicle seat back members 12A, 12B rests inside the widened ends 84 of the lower cross member 80. The first and second vehicle seat back members 12A, 12B include a gap 85 on the bottom portion 44 that separates the front wall 16 from the rear wall 18. The rear wall 18 generally includes a groove 88 that extends along the longitudinal extent of the rear wall 18. The groove 88 provides additional structural integrity to the longitudinal extent of the rear wall 18. The first and second vehicle seat back members 12A, 12B, upper cross support 52 and lower cross member 80 generally define a seat back frame 89.

As shown in FIGS. 7-10, the rear wall 18 of the vehicle seat back member 12A includes a connecting edge 90 and an inside edge 92. The rear wall 18 interfaces with the central web 14 at the connecting edge 90. The inside edge 92 includes a support flange 94. The support flange 94 is shown extending orthogonally from the rear wall 18. However, it is contemplated that the support flange 94 could extend in any of a variety of angles from the rear wall 18. In addition, the front wall 16 includes the inwardly turned front lip 96. The shear center load path 22 of the vehicle seat back member 12A is disposed proximate an inside corner 24 defined by the connection of the central web 14 and the rear wall 18. The shear center load path 22 extends substantially along the longitudinal extent of the rear wall 18. The shear center load path 22 is generally confined to a space defined between the central web 14, the rear wall 18, and an invisible boundary 99 extending between the front edge 41 and the inside edge 92. During a rear collision event, the body of an occupant is thrust back into the seat 11. The resulting force is transmitted through the seat back 13 downward along the shear center load path 22 to the recliner hearts 49A, 49B where the force is relayed to the seat base 30.

Referring now to FIGS. 8A-8E, and as mentioned above, the depth of the first and second vehicle seat back members 12A, 12B generally increases from the top portion 46 of the first and second vehicle seat back members 12A, 12B to the bottom portion 44 of the first and second vehicle seat back members 12A, 12B. Notably, the shear center load path 22 remains positioned at the inside corner 24 of the first and second vehicle seat back members 12A, 12B. More specifically, as the shear center load path 22 extends down the first and second vehicle seat back members 12A, 12B, the shear center load path 22 maintains a position generally defined by the connection of the central web 14 and the rear wall 18, and does not extend to an outside corner 102 of the connection of the central web 14 and the rear wall 18.

Figure 11:
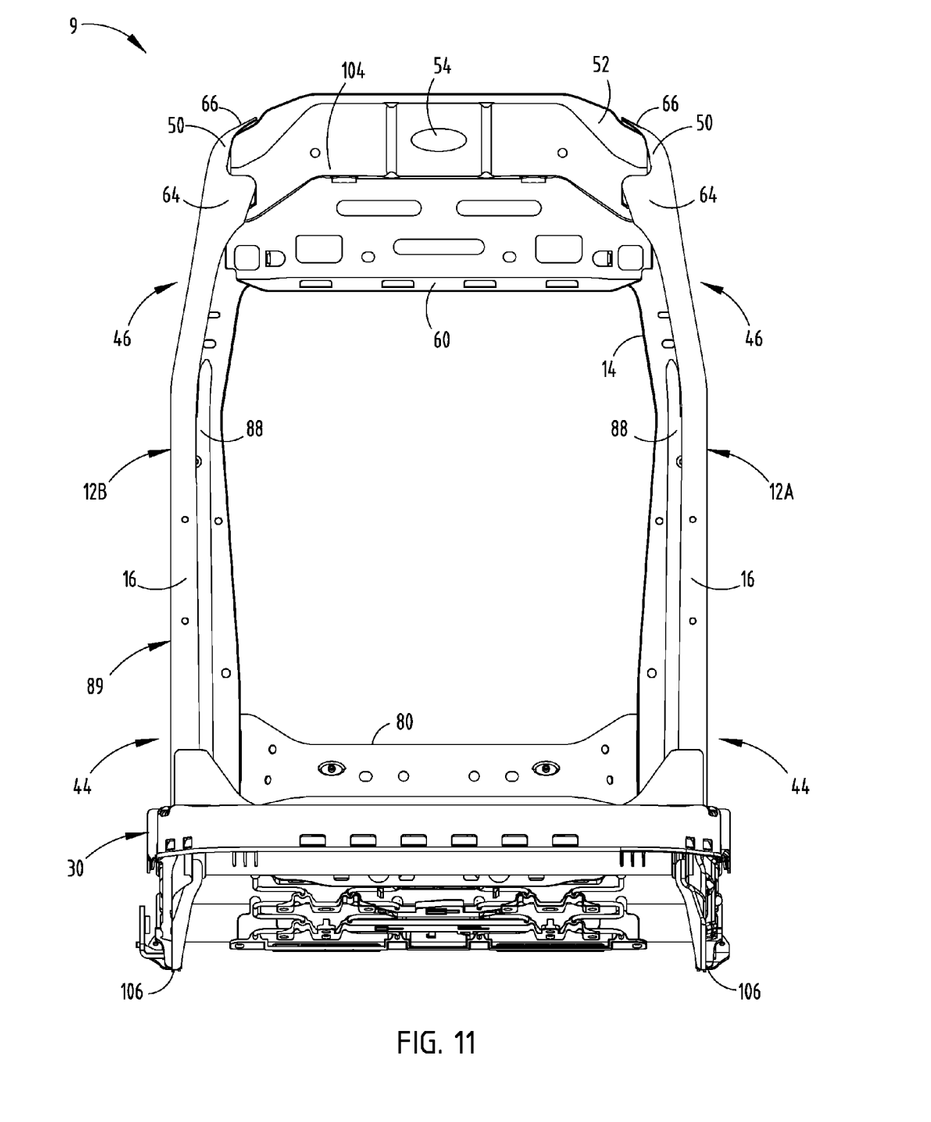
FIG. 11 is a front elevational view of the vehicle seat back illustrating the impact zone.
Figure 12:
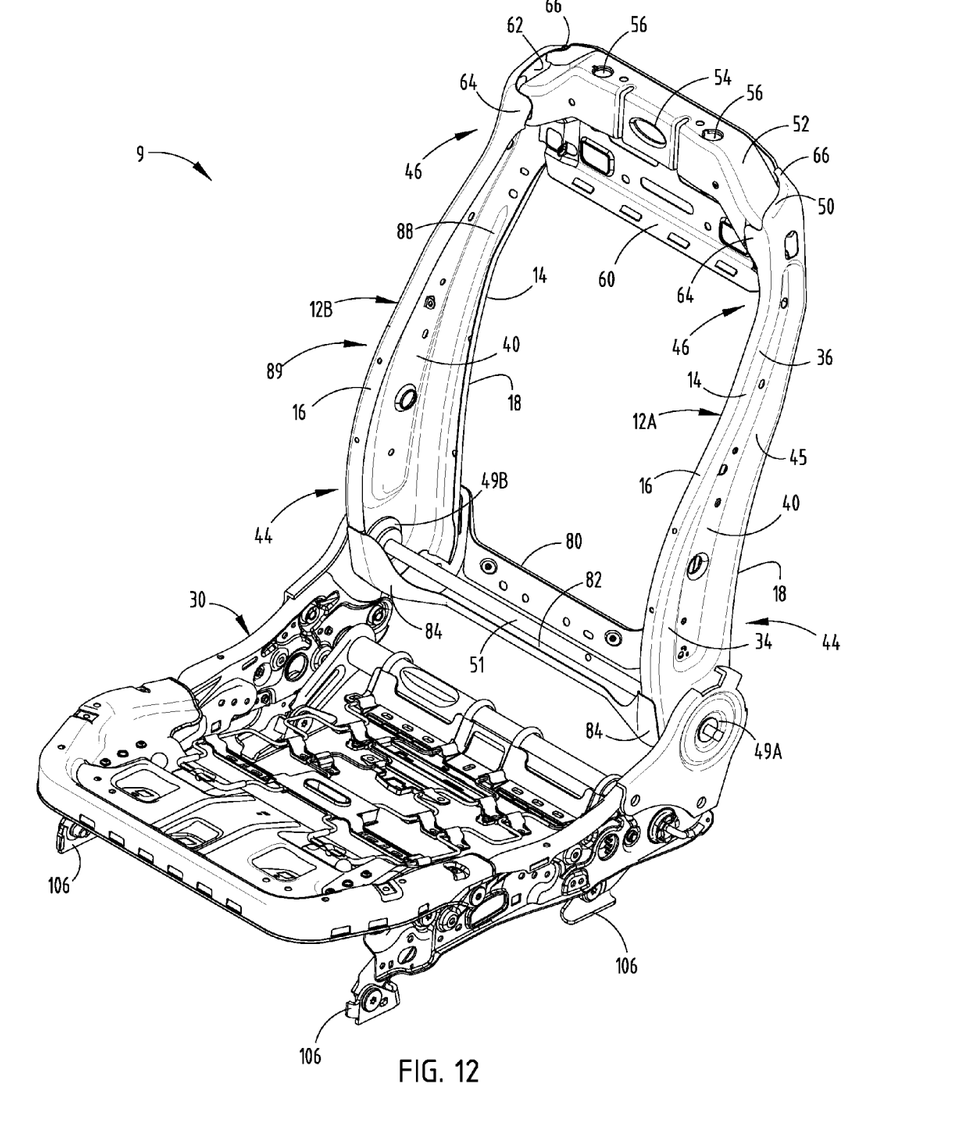
FIG. 12 is a top perspective view of the vehicle seat back of FIG. 11.

Referring now to FIGS. 11 and 12, the seat back generally defines an occupant rear impact zone pocket 104 that receives the load associated with an occupant during a rear impact. The impact zone pocket 104 is substantially uniform and generally equidistantly spaced between the sides of the seat base 30. It is contemplated that cushions disposed over the seat back will distribute the load associated with the rear impact evenly across the first vehicle seat back member 12A, second vehicle seat back member 12B, the upper cross support 52, and the lower cross member 80. The optimization of the occupant rear impact zone pocket 104 allows for the supporting members including the first seat back support member 12A, second vehicle seat back member 12B, upper cross support 52, and lower cross member 80 to be constructed from a very thin metal. The metal from which the supporting members are constructed may be as thin as 0.9 mm. The metal may be formed, stamped, etc.

Figure 13:
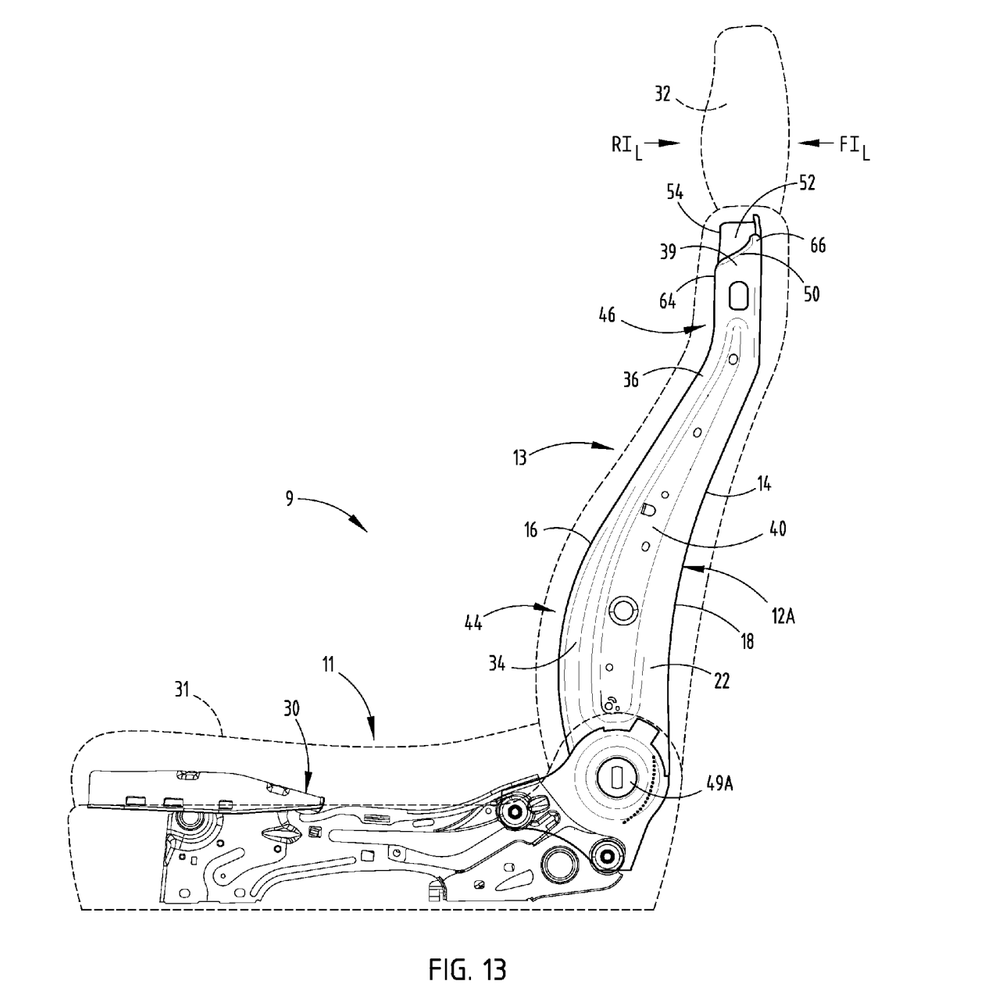
FIG. 13 is a side elevational view of the vehicle seat back with the shear center load path illustrated.

Referring now to FIGS. 13 and 14, first and second seat back support member 12A, 12B are designed to transfer impact forces downwardly through the shear center load path 22 along the connection of the central web 14 and the rear wall 18. As noted above, the shear center load path 22 does not extend to an outside corner 102 of the connection of the central web 14 and the rear wall 18. Additionally, the shear center load path 22 includes a substantially direct alignment with each recliner heart 49A and 49B providing for an optimized seat back construction that transfers load evenly from the seat back 13 to the seat base 30. The recliner hearts 49A and 49B are generally spaced approximately 450 mm apart. The optimized shear center load path 22 is aligned with the recliner heart +/−20 mm and generally centered over the seat base 30 and seat base legs 106 to provide resistance to torsional forces during front and rear collision events.

The first and second vehicle seat back members 12A, 12B, as disclosed herein, are generally designed to efficiently transmit forces from the body of an occupant to the seat base 30 and eventually the frame of the vehicle 10 during both normal use and during collision events. The shear center load path 22 extends along each of the first and second vehicle seat back members 12A, 12B and maintains a generally consistent direction as forces applied from the body of an occupant are directed downward. More specifically, rear impact forces in the direction of arrow $RI_L$ are directed downward through the first and second vehicle seat back members 12A, 12B along the shear center load paths 22 to the recliner hearts 49A, 49B which distribute the load to the seat base 30 and ultimately the frame of the vehicle. Similarly, front impact loads in the direction of arrow $FI_L$ are directed downward through the first and second vehicle seat back members 12A, 12B along the shear center load paths 22 to the recliner heart and eventually to the seat and the frame of the vehicle 10. Consequently, the vehicle seat back 13 of the present invention provides safety to occupants, is easy to manufacture, and uses minimal materials, thereby resulting in a strong yet lightweight vehicle seat.

The vehicle seat back 13 disclosed in detail herein has an optimized construction that eliminates discontinuities or irregularities in the shear center load path 22. Traditional seat back designs include shear center load paths that can deviate in various directions before transferring loads to a seat base. In addition, the seat back 13 architecture is centered around the occupant and provides additional strength to the vehicle seat back 13 and helps protect occupants during collision events. The seat back 13 utilizes laser-welding technology such that the vehicle seat back members 12A, 12B can be fabricated with very thin metal (0.9 mm thick). Furthermore, traditional seat backs often employ a multitude of parts to achieve various functions. The seat back 13 of the present invention integrates many parts such that the overall part count, weight, and cost to build the seat back 13 is minimized.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat back comprising:
   first and second support members each having a central web and a rear wall extending therefrom;
   a seat base disposed below the first and second support members; and
   a recliner heart operably connecting the seat base with the first and second support members, wherein a shear center of the first and second support members extends along an inside corner connection of the central web and the rear wall of the first and second support members and into the seat base.

2. The vehicle seat back of claim 1, wherein the rear wall includes a groove that extends along the longitudinal extent of the rear wall.

3. The vehicle seat back of claim 1, comprising:
   a support flange that extends from an inside edge of the rear wall.

4. The vehicle seat back of claim 1, comprising:
   an upper cross support and a lower cross member which together with the first and second support members define an impact zone pocket.

5. The vehicle seat back of claim 1, comprising:
   a front wall that extends from the central web, the front wall having a front lip extending therefrom.

6. The vehicle seat back of claim 5, wherein the front wall includes a substantially convex construction and the rear wall includes a substantially concave construction.

7. The vehicle seat back of claim 1, wherein a top portion of the vehicle seat back includes a scalloped upper cross support.

8. The vehicle seat back of claim 1, wherein a bottom portion of the vehicle seat back includes a lower cross member that wraps around a bottom portion of the first and second support members.

9. A vehicle seat back comprising:
   first and second support members having a central web;
   a scalloped upper cross member extending between the first and second support members; and a rear wall extending along the central web, wherein lateral load forces applied to the vehicle seat back result in a shear center that extends along an inside corner defined by the connection of the rear wall and the central web and into a seat base.

10. The vehicle seat back of claim 9, wherein the rear wall includes a groove that extends along the longitudinal extent of the rear wall.

11. The vehicle seat back of claim 9, comprising:
a support flange that extends from an inside edge of the rear wall.

12. The vehicle seat back of claim 9, wherein the central web includes a recessed portion.

13. The vehicle seat back of claim 9, comprising:
a front wall that extends from the central web, the front wall having a front lip extending therefrom.

14. The vehicle seat back of claim 9, wherein the front wall includes a substantially convex construction and the rear wall includes a substantially concave construction.

15. The vehicle seat back of claim 9, wherein the first and second support members are operably connected with a scalloped lower cross member.

16. The vehicle seat back of claim 9, wherein a bottom portion of the vehicle seat back includes a lower cross member that wraps around a bottom portion of the vehicle seat back.

17. A vehicle seat back comprising:
an upper cross member having a scalloped forward portion;
a lower cross member having a scalloped rearward portion; and
first and second support members connected by the upper and lower cross members and having a central web connected with a recliner heart, wherein lateral forces applied to the vehicle seat back result in a shear center that extends along an inside corner connection of the central web and a rear wall of the first and second support members and into a seat base.

18. The vehicle seat back of claim 17, wherein the rear wall includes a groove that extends along the longitudinal extent of the rear wall.

19. The vehicle seat back of claim 17, comprising:
an upper cross support and a lower cross member which together with the first and second support members define an impact zone pocket.

20. The vehicle seat back of claim 17, comprising:
a front wall that extends from the central web, the front wall having a front lip extending therefrom.

* * * * *